(12) United States Patent
Lee

(10) Patent No.: US 6,460,177 B1
(45) Date of Patent: Oct. 1, 2002

(54) METHOD FOR TARGET-SPECIFIC DEVELOPMENT OF FIXED-POINT ALGORITHMS EMPLOYING C++ CLASS DEFINITIONS

(75) Inventor: Cheng-Chieh Lee, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/401,136

(22) Filed: Sep. 22, 1999

(51) Int. Cl.[7] ............................................. G06F 9/45
(52) U.S. Cl. ...................................................... 717/146
(58) Field of Search ................................. 717/146, 136, 717/140

(56) References Cited

U.S. PATENT DOCUMENTS

| | | | | |
|---|---|---|---|---|
| 5,995,122 A | * | 11/1999 | Hsieh et al. | 345/523 |
| 6,173,247 B1 | * | 1/2001 | Maurudis et al. | 703/23 |
| 6,223,198 B1 | * | 4/2001 | Oberman et al. | 708/620 |
| 6,247,116 B1 | * | 6/2001 | Abdallah et al. | 712/221 |
| 6,266,769 B1 | * | 7/2001 | Abdallah et al. | 712/221 |
| 2001/0023425 A1 | * | 9/2001 | Oberman et al. | 708/620 |

OTHER PUBLICATIONS

K. Kum, J.Kang, and W. Sung, "A Floating–Point To Interger C Converter With Shift Reduction For Fixed–Point Digital Signal Processors," IEEE ICASSP, pp. 2163–2166, Mar. 1999.

* cited by examiner

Primary Examiner—Tuan Q. Dam
Assistant Examiner—John Q. Chavis
(74) Attorney, Agent, or Firm—Kenneth M. Brown

(57) ABSTRACT

An automated method for the development of fixed-point algorithms which have been initially implemented as floating-point code which advantageously hides most of the tedious operations that need to be performed across the various stages of such a conversion procedure inside the definitions of a set of C++ classes. With the aid of these C++ class definitions, the fixed-point design process (i. e., the conversion from floating-point code to equivalent fixed-point code) is substantially simplified. Specifically, in accordance with the preferred embodiment of the present invention, a programmer need only to include and/or exclude certain previously defined header files, and to change the variable declarations within the floating-point code, in order to simulate the source codes across various stages of the conversion process.

3 Claims, 3 Drawing Sheets

METHOD FOR TARGET-SPECIFIC DEVELOPMENT OF FIXED-POINT ALGORITHMS EMPLOYING C++ CLASS DEFINITIONS

FIELD OF THE INVENTION

The present invention relates generally to the development of fixed-point algorithms and more particularly to a methodology employing C++ class definitions for converting floating-point algorithms to corresponding target-specific fixed-point algorithms to be used, for example, in signal processing applications.

BACKGROUND OF THE INVENTION

In the early development stage of many high-complexity algorithms such as, for example, signal processing algorithms, software developers commonly perform the initial implementations using "floating-point" variables and arithmetic. This is done in order to bypass the burden of dealing with complex practical implementation issues, such as computation overflow, and therefore to speed up the algorithm development process. Once (or even before) this high level task is finalized, however, it is usually necessary to convert the implemented algorithms to a lower level "fixed-point" description. Such a need is driven, inter alia, by the fact that the algorithms must ultimately be implemented in more cost-efficient fixed-point processors, and/or they involve communications-related applications for which bit compliance may be critical in order to retain portability across different platforms.

Most typically, a three-stage procedure for fixed-point prototyping of floating-point algorithms is employed. The first stage is used to collect statistical information about the implemented floating-point algorithm (i.e., the initially implemented code), such as, for example, the dynamic range of the floating-point variables which are used in the code. The second stage is used to transform these floating-point variables into corresponding fixed-point representations. And the third stage replaces all floating-point operations with appropriately defined fixed-point operations, thereby allowing the code to operate on a fixed-point processor. In particular, this third stage may advantageously assume a particular target fixed-point processor, thereby allowing for the fixed-point operations to be defined so as to emulate those of the target processor.

Unfortunately, traditional approaches to the conversion of the initial floating-point algorithm code to a fixed-point implementation, even when using the above-described three stage procedure, invariably have several serious drawbacks. In particular, they tend to be inefficient, inflexible, tedious, and error prone. The original source code must be modified in a manner such that the final code appearance and the logical flow thereof are often quite different from that of the original (i.e., floating-point) code. Moreover, a substantial investment in time is usually required to perform the conversion, resulting in both high manpower costs as well as substantial real-time delays.

SUMMARY OF THE INVENTION

To circumvent the drawbacks of traditional approaches to the development of fixed-point algorithms initially implemented as floating-point code, a new methodology is proposed in accordance with the principles of the present invention. In particular, and in accordance with an illustrative embodiment of the method of the present invention, most of the tedious operations which need to be performed across the various stages of such a conversion procedure may be advantageously hidden inside the definitions of a set of C++ classes. With the aid of these C++ class definitions, the fixed-point design process can be substantially simplified. In accordance with the principles of the present invention as embodied in a preferred embodiment thereof, a programmer need only to include and/or exclude certain previously defined header files, and to change the variable declarations within the floating-point code, in order to simulate the source code across various stages of the above-described conversion process.

Specifically, in accordance with an illustrative embodiment of the present invention, a three-step method is provided for transforming a first set of program code including floating-point operations into a second set of program code in which fixed-point operations have been substituted for the floating-point operations. First, the illustrative method modifies the first set of program code by substituting for the floating-point variables of interest one or more newly defined data types which have been defined together with associated overloaded assignment operators for capturing the dynamic ranges of the floating-point variables upon the execution of modified code. Then, this modified program code is compiled and executed, thereby capturing the relevant dynamic range information. Finally, the code is modified again, this time by specifying additional data types defining one or more integer representation formats, and substituting for the (previously) floating-point variables the appropriate one of these data types based on the determined dynamic range therefor. In addition, one or more member functions are associated with each of these additional data types for converting between the given integer representation format and floating-point values.

BRIEF DESCRIPTION OF THE DRAWINGS

FIG. 1 illustrates the operation of an illustrative three stage procedure for performing fixed-point prototyping of floating-point algorithms.

DETAILED DESCRIPTION

Figure 1A:
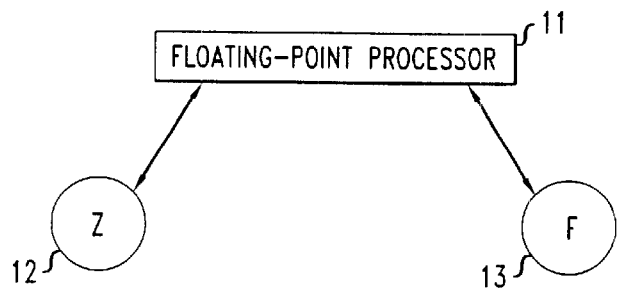
FIG. 1A shows the first stage, referred to as Stage-I.

An Illustrative Procedure for Fixed-point Prototyping of Floating-point Algorithms FIG. 1 illustrates the operation of an illustrative three stage procedure for performing fixed-point prototyping of floating-point algorithms. FIG. 1A shows the first stage, referred to as Stage-I, which comprises a simplified representation of the original floating-point algorithm. Floating-point processor 11 may be a dedicated floating-point processor, or it may be a general-purpose processor that can perform both integer (i.e., fixed-point) and floating-point arithmetic operations. Specifically, processor 11, inter alia, reads algorithmic variables from memory, performs arithmetic operations, and stores results back into memory. The variables are advantageously partitioned, according to their types, into fixed-point (integer) variable set 12, denoted as Z, and floating-point variable set 13, denoted as F.

Figure 1B:
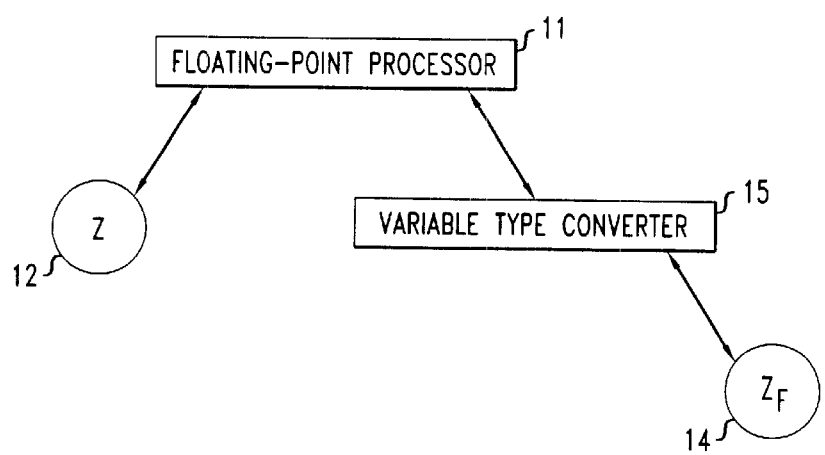
FIG. 1B shows the second stage, referred to as Stage-II.

FIG. 1B shows the second stage of the illustrative three stage procedure for performing fixed-point prototyping of floating-point algorithms, referred to as Stage-II. In this stage, floating-point variable set 13 (F) is first transformed into (an appropriate and corresponding) fixed-point representation 14, denoted as $Z_F$. Advantageously, the dynamic range and precision requirements for all elements in floating-point variable set 13 (F) have been previously diagnosed from Stage-I, and may thereby be used to specify the appropriate transformation protocol.

Specifically, the diagnosis of the dynamic range and precision requirements for floating-point variables in C (or C++) program code is well known to those of ordinary skill in the art. (See, for example, K. Kum et al., "A floating-point to integer C converter with shift reduction for fixed-point digital signal processors" in Proc. IEEE ICASSP, pp. 2163–2166, March 1999) This transformation protocol is recognized and processed by variable type converter 15, which serves as an interface between fixed-point representation 14 ($Z_F$) and floating-point processor 11, which is advantageously the same processor as used in Stage-I.

Figure 1C:
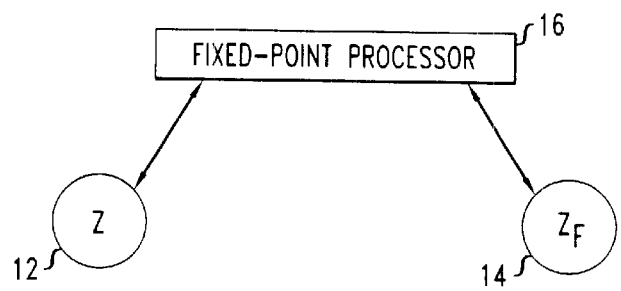
FIG. 1C shows the third stage, referred to as Stage-III.

Finally, FIG. 1C shows the third and final stage of the illustrative three stage procedure for performing fixed-point prototyping of floating-point algorithms, referred to as Stage-III. In this stage, the data type interface (variable type converter 15) is removed, and all floating-point arithmetic operations as performed in Stage-II are advantageously replaced with appropriately defined fixed-point arithmetic operations. Therefore, as shown in FIG. 1C, floating-point processor 11 is replaced with fixed-point processor 16 in Stage-III, although fixed-point processor 16 continues to operate on fixed-point variable set 12 (Z) and fixed-point representation 14 ($Z_F$).

Fixed-point processor 16 may, in certain illustrative embodiments of the present invention, be the same processor as floating-point processor 11 used in Stage-I and Stage-II, but subjected to the constraint that only its integer arithmetic is allowed to execute the fixed-point arithmetic operations. Moreover, a target fixed-point processor (i.e., the processor which is intended to be used in the final application for which the given program code is being developed) may be advantageously assumed, in which case the fixed-point operations which fixed-point processor 16 is constrained to execute are specifically defined to emulate the corresponding operations of the target processor. Note that since integer arithmetic operations are often identical across various processors, bit compliance in general can be advantageously retained within this stage. Ultimately, the program code can then be ported to the target processor with essentially guaranteed bit compliance.

A Traditional Approach to the Illustrative Fixed-point Prototyping Procedure

Figure 2:
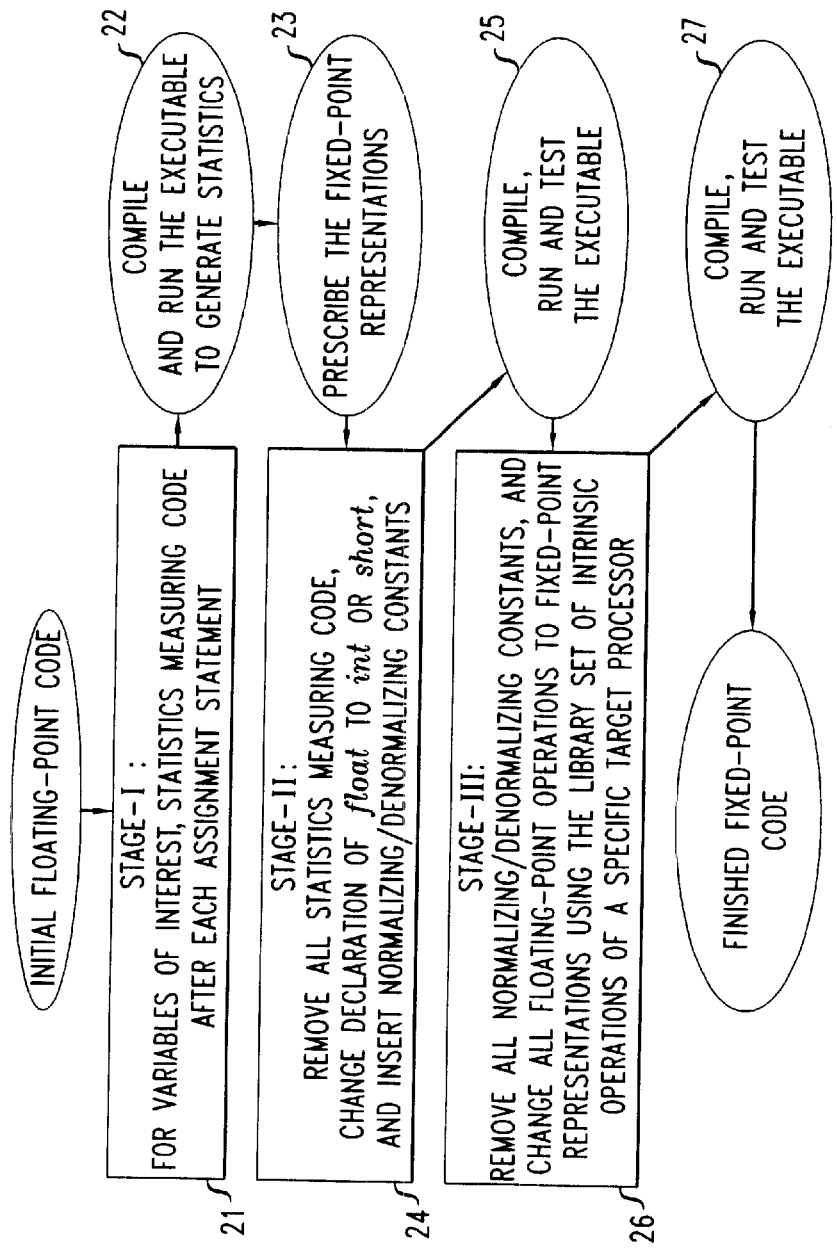
FIG. 2 shows a flow chart of a traditional, prior art approach to implementing the illustrative procedure for performing fixed-point prototyping of floating-point algorithms whose operation is illustrated in FIG. 1.

FIG. 2 shows a flow chart of a traditional, prior art approach to implementing the illustrative procedure for performing fixed-point prototyping of floating-point algorithms whose operation is illustrated in FIG. 1. Specifically, for purposes of explanation, the following discussion will provide a "walk through" of a design example, of which the objective is to fixed-point prototype a small portion of floating-point C code, using the traditional, prior art technique of FIG. 2. As will be demonstrated herein, this technique can be very inefficient, inflexible and error prone, resulting in the impression that fixed-point prototyping is necessarily a tedious and difficult task. The illustrative portion of floating-point C code to be used in the design example follows:

```
const int M2=33;
static float smr[M2]; /*signal to masking threshold ratio*/
static float specfit[M2]; /*spectral fit envelope*/
static float mask[M2]; /*masking threshold*/
    for (i=0; i<M2; i++){
        smr[i]=10.*log10(specfit[i]/mask[i]);
    }
```

Typically, as described above, the Stage-I portion of the process is used mainly to collect the statistical information, such as, for example, the dynamic range of the variables of interest. In the present case, these variables include smr [ ], specfit [ ], and mask [ ]. This collected information may then be used to diagnose the required precision in the subsequent Stage-II portion of the process when transforming these variables into fixed-point representations. Specifically, a brute force solution employed by the traditional, prior approach and as specified in block 21 of the flow chart of FIG. 2, may be used to manually insert information collecting code immediately after each assignment statement of which the variable of the interest is the destination operand. Thus, repetitive execution of the code (as part of the Stage-I portion of the process) will generate the required statistical information.

With reference to the instant example, dynamic range information, for example, could be collected by declaring two float variables which we have named smr_max and smr_min, and by inserting the following code immediately after the assignment statement "smr[i]=10.*log10(specfit[i]/mask[i]);":

```
if (smr[i]>smr_max) smr_max=smr[i];
if (smr[i]<smr_min) smr_min=smr[i];
```

In this manner, the two newly defined variables can be used to capture the maximum and minimum values of the variable smr[i]. However, note that this type of prior art approach can be very inefficient when it entails very high lexical or editing complexity (e.g., when there are many different variables or assignment statements after which code must be inserted). Moreover, it is highly error prone, since it is easy for the user to accidentally fail to insert the necessary code after one or more of the appropriate assignment statements.

Using the above brute force solution, the instant example was analyzed (block 22 of the flow chart of FIG. 2) and yielded dynamic ranges for the relevant variables smr[ ], specfit[ ], and mask[ ]—specifically, [−21.5, 15.1], [0, 67193.9], and [0, 2056.8], respectively. As a result of the determined range, it was decided (block 23 of FIG. 2) that in Stage-II, smr [ ] would be best represented using a 16-bit word (Word16), with 1 bit for the sign, 5 bits for the integer part, and 10 bits dedicated to the fractional part (Q10). (The notation Word16:Q10 will hereinafter be used to describe such a representation, and similarly for other values.) Similarly, specfit[ ] would be represented using a 32 bit word (Word32), with 14 bits allocated to the fractional part (Q14)—that is, in Word32:Q14. And finally, it was decided that, for reasons of convenience, mask [ ] would use the same representation as specfit[ ], namely Word32:Q14.

Note that the above described decision-making process may be somewhat ad hoc. In other prior art approaches, additional information, such as, for example, distribution and deviation data, may also be collected in addition to the dynamic range information. This additional information may enable the process of deciding the appropriate representations for the variables in Stage-II somewhat more automated. See, e.g., K. Kum et al., cited above.

The Stage-II portion of the process involves the removal of the statistic measurement code, the substitution of either int or short data types for those which had been of type float, and the insertion of appropriate normalizing/denormalizing constants. (See block 24 of FIG. 2.) The key module in the Stage-II portion of the process is variable type converter 15, as shown in FIG. 1B. This data type converter operates between floating-point processor 11 and fixed-point representation 14 ($Z_F$), the set of integer representations of the floating-point variables. If code is manually inserted to emulate this data type interface (i.e., variable type converter 15), the resultant code for the illustrative design example might then look as follows:

```
typedef int Word32;
typedef short Word16;
const int M2=33;
static Word16 smr[M2]; /*Q14 sig. to mask. threshold ratio*/
static Word32 specfit[M2]; /*Q10 spectral fit envelope*/
static Word32 mask[M2]; /*Q10 masking threshold*/
for (i=0; i<M2; i++){
    smr[i]=(Word16)
        (1024.*(10.*log10((specfit[i]/16384.)/
        (mask[i]/16384.))));
}
```

The next step in the traditional process is to compile and run the resulting executable, and to test the results to ensure that the code runs as expected (block 25). Although the code segment as shown above works properly for the intended purpose, the approach is quite inefficient, as it may entail very high lexical and editing complexity (e.g., it may be necessary to modify many variables having different "Q-values"), and it is likely to be error prone (e.g., it may fail to scale or falsely scales some of the variables).

Finally, the Stage-III portion of the prior art brute force approach manually replaces the data type converter (i.e., variable type converter 15) and the floating-point arithmetic operations of Stage-II with a set of (possibly target-specific) fixed-point operations. Specifically, as shown in block 26 of FIG. 2, the normalizing/denormalizing constants are removed, and all of the floating-point operations are changed to fixed-point representations using the set of intrinsic operations of the specific target processor. By way of illustration herein, we will use the set of fixed-point intrinsic functions which emulate the TMS320C50™ processor from Texas Instruments Incorporated, familiar to those of ordinary skill in the art. The resultant code (using functions defined with respect to the TMS320C50 processor, also familiar to those skilled in the art) which replaces the assignment statement in the above code segment follows:

```
Word16 exp_s, exp_m, tmp;
Word32 a0, a1;
exp_s=norm_l(specfit[i])-1;
a0=L_shl(specfit[i], exp_s);
exp_m=norm_l(mask[i]);
a1=L_shl(mask[i], exp_m);
tmp=div_s(extract_h(a0), extract_h(a1));
a0=L_add(Log2(L_deposit_l(tmp)),
    L_deposit_h(exp_m-exp_s-15));
a0=Mpy_32_16(a), 24660);
smr[i]=extract_l(L_shr(a0,4));
```

Finally, this code must be compiled and the resulting executable must be tested. (See block 27 of FIG. 2.) Although the above code also works properly, it can be seen that there are drawbacks associated with the use of the fixed-point code which results from this traditional approach. First, the simple floating-point arithmetic from the original code has been broken down into a detailed aggregate of intrinsic fixed-point operations, thereby yielding an almost totally changed code structure. This makes the debugging process far more complex, since the original code structure has been lost. Note also that the functions div_s and Log2 are not intrinsic processor operations, but rather, other aggregates of intrinsic fixed-point operations.

Second, the "Q-values" are implicitly buried into the code and are not clearly specified anywhere within the code so as to allow for subsequent updating of the code with relative ease. For example, suppose that it later becomes clear that Word32:Q16 would be a superior choice of format for the variable mask [ ] than the previously assumed Word32:Q14, and it would therefore be desirable to change the code accordingly.

Although a simple way to effectuate this change might in fact be to modify the input argument to the function L_deposit_h (as found in the third to the last line of code above) to be "exp_m-exp_s-13" rather than "exp_m-exp_s-15", it may require a considerable effort to make such a determination, requiring a detailed analysis of the code and an intimate understanding of the generation process thereof. Moreover, the variable mask [ ] may appear in many other places in the code with different arithmetic characteristics. As such, a substantial amount of time may be required to debug the modified code.

And third, inflexibility and inefficiency often result from the requirement that bit compliance be appropriately enforced. For example, in the instant case, the arithmetical and logical unit (ALU) of the TMS320C50 processor performs 32-bit operations without the support of guarding bits to protect against arithmetic overflows. Since the set of fixed-point intrinsic instructions required to meet a given coding standard (such as, for example, the ITU-T Recommendation G.729 proposed standard, familiar to those of ordinary skill in the art) is meant to dictate the code to fit in the specific processor, it should help considerably when porting the code to the matched processor. However, when implementing the code in a mismatched processor (e.g., the improved TMS320C54x processor for which the ALU accumulator has 8 added guarding bits), not only are additional effort and added instructions required in order to enforce bit compliance, but the different (often superior) features of the improved processor can not be advantageously used.

A Novel Illustrative Fixed-point Prototyping Method Employing C++ Classes

Figure 3:
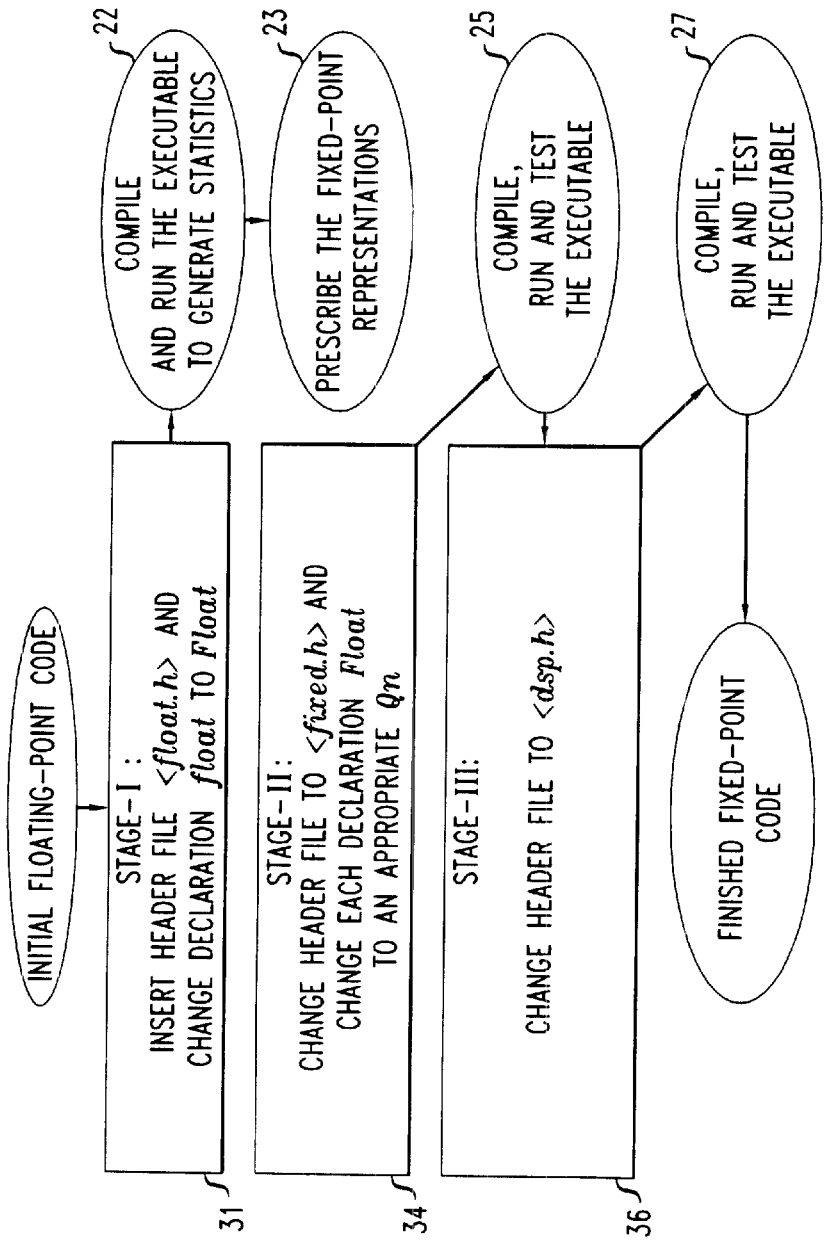
FIG. 3 shows a flow chart of a novel illustrative method for performing fixed-point prototyping of floating-point algorithms, which method advantageously employs C++ classes in accordance with a preferred embodiment of the present invention.

In accordance with an illustrative embodiment of the present invention, a set of C++ classes may be defined, the use of which can circumvent many of the drawbacks of traditional prior art approaches such as that described above. Specifically, FIG. 3 shows a flow chart of a novel illustrative method for performing fixed-point prototyping of floating-point algorithms, which method advantageously employs such C++ classes in accordance with a preferred embodiment of the present invention. Based on these C++ classes, the following describes a novel illustrative fixed-point prototyping method using a "walk through" of the same illustrative design example (i.e., the same floating-point C code segment) used above in the discussion of the traditional approach. For purposes of convenience to the reader, this code is repeated here:

```
    const int M2=33;
    static float smr[M2]; /*signal to masking threshold ratio*/
    static float specfit[M2]; /*spectral fit envelope*/
    static float mask[M2]; /*masking threshold*/
        for (i=0; i<M2; i++){
            smr[i]=10.*log10(specfit[i]/mask[i]);
        }
```

In accordance with the illustrative embodiment of the present invention, the lexical and editing complexity inherent in the Stage-I portion of the traditional prior art approach described above may be advantageously reduced (or even eliminated), by defining a new C++ class (data type) and by attaching the information collecting function to the overloaded assignment operators (such as, for example, =, +–, and –=) for this class. In particular, a class template FLOAT<T> (where T can be either the built-in type float or the built-in type double) is defined in a header file float.h which includes as private data members a T-type variable value and several variables for holding the dynamic range information. All assignment operators are advantageously overloaded to include the information collecting function. To reduce or even avoid the need to modify the original source code, a conversion rule operator <T> ( ) is defined which advantageously instructs the C++ compiler how to convert a FLOAT<T> object to a built-in data type where it is needed. In addition, the reporting of the dynamic range information is advantageously defined in its destructor (i.e., the destructing member function), so that after the code has executed the range information for all FLOAT<T> objects will be printed out. Note specifically that the class template FLOAT<T> is type redefined to proliferate two classes—Float and Double as follows:

```
    typedef FLOAT<float> Float;
    typedef FLOAT<double> Double;
```

With the aid of this C++ class definition to measure the dynamic range of the variables of interest, the floating-point source code is advantageously modified slightly for the Stage-I portion of the illustrative novel fixed-point prototyping method as shown in block 31 of FIG. 3. Specifically, the header file float.h is included and the declaration of each float is changed to Float resulting in the following code segment:

```
    # include <float.h>
    const int M2=33;
    static Float smr[M2]; /*signal to masking threshold ratio*/
    static Float specfit[M2]; /*spectral fit envelope*/
    static Float mask[M2]; /*masking threshold*/
        for (i=0; i<M2; i++){
            smr[i]=10.*log10(specfit[i]/mask[i]);
        }
```

Then, as shown in block 22 of FIG. 3, the code is compiled and executed to generate the dynamic range information as it is in the traditional prior art approach of FIG. 2 and described above.

The inefficiency of the Stage-II portion of the traditional prior art approach described above can also be advantageously circumvented in accordance with an illustrative embodiment of the present invention as follows. Another class template FIXED<T,q> (where T is either Word32 or Word16)is defined in another header file fixed.h which includes as private data members an integer variable value of the specified type T, and an integer variable Q holding the Q-value of the object (as defined above). To emulate the data type converter of FIG. 1B (i.e., variable type converter 15), we define a member function FIXED<T,q>& operator= (const float&x) which converts a float value in to a FIXED<T,q> object. In addition,we define a conversion rule operator <float> ( ) which performs the reverse conversion. This class template may then be advantageously used to proliferate various 16-bit and 32-bit classes as follows:

```
    typedef FIXED<Word16,16> Q16;
    typedef FIXED<Word16,15> Q15; . . .
    typedef FIXED<Word16,1> Q1;
    typedef FIXED<Word16,0> Q0;
    typedef FIXED<Word32,16> LQ16;
    typedef FIXED<Word32,15> LQ15;
    . . .
    typedef FIXED<Word32,1> LQ1;
    typedef FIXED<Word32,0> LQ0;
```

Using this set of C++ classes, as shown in block 34 of FIG. 3, the header file fixed.h is included and the Float declarations from the Stage-I modified code are changed to appropriate FIXED classes, in accordance with the prescriptions obtained from the Stage-I dynamic range measurement process (block 23 of FIG. 3). Specifically, the resulting code modification for the Stage-II portion of the illustrative method in accordance with the present invention may now look as follows:

```
    #include <fixed.h>
    const int M2=33;
    static Q10 smr[M2]; /*signal to masking threshold ratio*/
    static LQ14 specfit[M2]; /*spectral fit envelope*/
    static LQ14 mask[M2]; /*masking threshold*/
        for (i=0; i<M2; i++) {
            smr[i]=10.*log10(specfit[i]/mask[i]);
        }
```

Note that this code is advantageously simpler (and thereby less error prone) than the corresponding code which results from the Stage-II portion of the traditional prior art approach. To complete the Stage-II portion of the improved illustrative method in accordance with the present invention, this code is then compiled, executed, and tested, as shown in block of FIG. 3.

Finally, the Stage-III portion of the novel method also provides advantages over traditional prior art techniques. Specifically, to overcome the drawbacks of the traditional approach, the overall fixed-point description is advantageously separated into two hierarchical layers. In particular, the lower-layer description emulates the intrinsic operations of a given target processor, while the higher-layer description functions as an arithmetical interface between Stage-II and the lower-layer intrinsic processor operations. The lower-layer description of a specific processor can be advantageously implemented as a specific C++ class. This approach thereby provides flexibility, as switching to a different target processor becomes as simple as invoking the corresponding C++ class definition. The higher-layer description transforms the results from Stage-II into an equivalent arithmetic representation, which is then mapped to a corresponding aggregate of lower-layer intrinsic processor operations. In this manner, synchronizing the fixed-point code with the floating-point code is advantageously as straightforward as determining the equivalent "high-level" description of Stage-II. Thus, the illustrative method in accordance with the present invention adds efficiency and is less error prone.

Specifically, a class Accumulator is defined in a header file dsp.h to emulate the intrinsic operations of the target processor—in the case of the present example, those of the 40-bit ALU of the TMS320C54x processor. This corresponds to the lower layer target-specific description of the overall fixed-point design.

Meanwhile, the higher-layer description is advantageously implemented through the definition of two additional C++ classes. First, a class DSP (also contained in the header file dsp.h) is defined, which contains as data members an Accumulator object and an integer holding its Q-value. The class definition also overloads common operators (such as, for example, +, −,*, and /) in which the Q-values of the DSP operands are automatically processed and updated in the destination DSP operand. Second, the class template FIXED<T,q> (as defined above in connection with the Stage-II portion of the illustrative novel process) is redefined as a derived class template from the class DSP so that FIXED<T,q> will automatically inherit the overload operators defined for DSP. To instruct the compiler how to scale and store the content in a DSP object to a FIXED<T,q> object, it is only necessary to overload assignment operators—for example, FIXED<T,q>& operator=(DSP x).

As in the Stage-II portion of the illustrative process in accordance with the present invention, the class template FIXED<T,q> is advantageously used to proliferate the various 16-bit and 32-bit classes. Thus, as shown in block 36 of FIG. 3, the included header file for the code is changed to be the header file dsp.h. As such, with the aid of the above-described set of C++ classes, the fixed-point code for the Stage-III portion of the process is as follows:

```
#include <dsp.h>
const int M2=33;
static Q10 smr[M2]; /*signal to masking threshold ratio*/
static LQ14 specfit[M2]; /*spectral fit envelope*/
static LQ14 mask[M2]; /*masking threshold*/
    for (i=0; i<M2; i++){
    }
        smr[i]=Q13(3.0103)*log2(specfit[i]/mask[i]);
```

The above fixed-point representation advantageously hides most of the target specific intrinsic operation details in the C++ class definitions, thereby resulting in a more flexible, efficient, and less error prone approach. (Note that the above code advantageously makes use of the mathematical equality: $10 \log_{10}(x) = 3.0103 \log_2(x)$. The reason for this transformation is that the $\log_2( )$ function is easier to implement in the bit domain.) The final step in the illustrative method is to compile, execute, and test the above code, as shown in block 27 of FIG. 3. In general, a typical C++ compiler would interpret and process the assignment statement of the above code as follows:

First, both specfit[i] and mask[i] would be treated as DSP objects and the DSP operator "/" would be invoked. The result from this divide operation would then be used as the input to invoke the function DSP log2 (DSP x). Next, the object Q13 (3.0103) would be treated as a DSP object and multiplied, by invoking the DSP operator "*", to the output from the function log2 ( ). Finally, the content in the resulting DSP object would be scaled and stored into smr[i]—a Q10 object.

Addendum

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any flow charts, flow diagrams, state transition diagrams, pseudo-code, and the like represent various processes which may be substantially represented in computer readable medium and so executed by a computer or processor, whether or not such computer or processor is explicitly shown.

I claim:

1. A method for transforming a first set of program code into a second set of program code, each of said first and second sets of program code having been coded in an object-oriented programming language having definable classes and operator overloading capability, the first set of program code comprising one or more floating-point arithmetic operations to be performed on one or more floating-point variables defined therein, the second set of program code having one or more fixed-point arithmetic operations having been substituted for said one or more floating-point arithmetic operations, the method comprising the steps of:

(a) modifying said first set of program code to produce an intermediate set of program code, said modifying of said first set of program code comprising (i) defining within said first set of program code one or more first added class definitions, each of said first added class definitions comprising a corresponding first added data type and a corresponding set of overloaded assignment operators associated therewith. each of said overloaded assignment operators defined so as to capture dynamic range information associated with variables of said corresponding first added data type upon execution of said intermediate set of program code, and (ii) changing type definitions of said one or more floating-point variables within said first set of program code to one of said first added data types:

(b) compiling and executing said intermediate set of program code, thereby capturing dynamic range information associated with one or more of said variables of said first added data types; and (c) modifying said intermediate set of program code to produce said second set of program code, said modifying of said intermediate set of program code comprising (i) defining within said intermediate set of program code one or more second added class definitions, each of said second added class definitions comprising a corresponding second added data type and one or more member functions associated therewith, each of said second added data types defining a corresponding format for a fixed-point representation of a floating-point variable, each of said associated member functions defined so as to convert between one of said fixed-point representation formats and floating-point values, and (ii) changing type definitions of variables of one of said first added data types within said intermediate set of program code to one of said second added data types based upon said captured dynamic range information associated therewith, wherein said one or more first added class definitions are specified in a first header file, and wherein said step of modifying said first set of program code comprises inserting additional program code to include said first header file therein.

2. A method for transforming a first set of program code into a second set of program code, each of said first and second sets of program code having been coded in an object-oriented programming language having definable classes and operator overloading capability, the first set of program code comprising one or more floating-point arithmetic operations to be performed on one or more floating-point variables defined therein, the second set of program code having one or more fixed-point arithmetic operations having been substituted for said one or more floating-point arithmetic operations. the method comprising the steps of (a) modifying said first set of program code to produce an intermediate set of program code said modifying of said first set of program code comprising (i) defining within said first set of program code one or more first added class definitions, each of said first added class definitions comprising a corresponding first added data type and a corresponding set of overloaded assignment operators associated therewith, each of said overloaded assignment operators defined so as to capture dynamic range information associated with variables of said corresponding first added data type upon execution of said intermediate set of program code, and (ii) changing type definitions of said one or more floating-point variables within said first set of program code to one of said first added data types:

(b) compiling and executing said intermediate set of program code, thereby capturing dynamic range information associated with one or more of said variables of said first added data types: and (c) modifying said intermediate set of program code to produce said second set of program code, said modifying of said intermediate set of program code comprising (i) defining within said intermediate set of program code one or more second added class definitions, each of said second added class definitions comprising a corresponding second added data type and one or more member functions associated therewith, each of said second added data types defining a corresponding format for a fixed-point representation of a floating-point variable, each of said associated member functions defined so as to convert between one of said fixed-point representation formats and floating-point values, and (ii) changing type definitions of variables of one of said first added data types within said intermediate set of program code to one of said second added data types based upon said captured dynamic range information associated therewith, wherein said one or more second added class definitions are specified in a second header file, and wherein said step of modifying said intermediate set of program code comprises inserting additional program code to include said second header file therein.

3. A method for transforming a first set of program code into a second set of program code, each of said first and second sets of program code having been coded in an object-oriented programming language having definable classes and operator overloading capability, the first set of program code comprising one or more floating-point arithmetic operations to be performed on one or more floating-point variables defined therein, the second set of program code having one or more fixed-point arithmetic operations having been substituted for said one or more floating-point arithmetic operations, the method comprising the steps of:

(a) modifying said first set of program code to produce an intermediate set of program code, said modifying of said first set of program code comprising (i) defining within said first set of program code one or more first added class definitions, each of said first added class definitions comprising a corresponding first added data type and a corresponding set of overloaded assignment operators associated therewith. each of said overloaded assignment operators defined so as to capture dynamic range information associated with variables of said corresponding first added data type upon execution of said intermediate set of program code, and (ii) changing type definitions of said one or more floating-point variables within said first set of program code to one of said first added data types:

(b) compiling and executing said intermediate set of program code, thereby capturing dynamic range information associated with one or more of said variables of said first added data types; and (c) modifying said intermediate set of program code to produce said second set of program code, said modifying of said intermediate set of program code comprising (i) defining within said intermediate set of program code one or more second added class definitions, each of said second added class definitions comprising a corresponding second added data type and one or more member functions associated therewith, each of said second added data types defining a corresponding format for a fixed-point representation of a floating-point variable, each of said associated member functions defined so as to convert between one of said fixed-point representation formats and floating-point values, and (ii) changing type definitions of variables of one of said first added data types within said intermediate set of program code to one of said second added data types based upon said captured dynamic range information associated therewith, the method further comprising the step of modifying said second set of program code to produce a third set of program code, wherein said fixed-point arithmetic operations of said second set of program code are replaced in said third set of program code by fixed-point arithmetic operations intrinsic to a specified target fixed-point processor, wherein said step of modifying said second set of program code comprises defining a third added class definition which emulates said arithmetic operations intrinsic to said specified target fixed-point processor, and wherein said one or more second added class definitions are specified in a second header file, and wherein said step of modifying said intermediate set of program code comprises inserting additional program code to include said second header file therein.

* * * * *